Aug. 25, 1964  W. P. HILL  3,145,756
NUMERICALLY CONTROLLED TUBE BENDING MACHINE
Filed Sept. 19, 1961  8 Sheets-Sheet 1
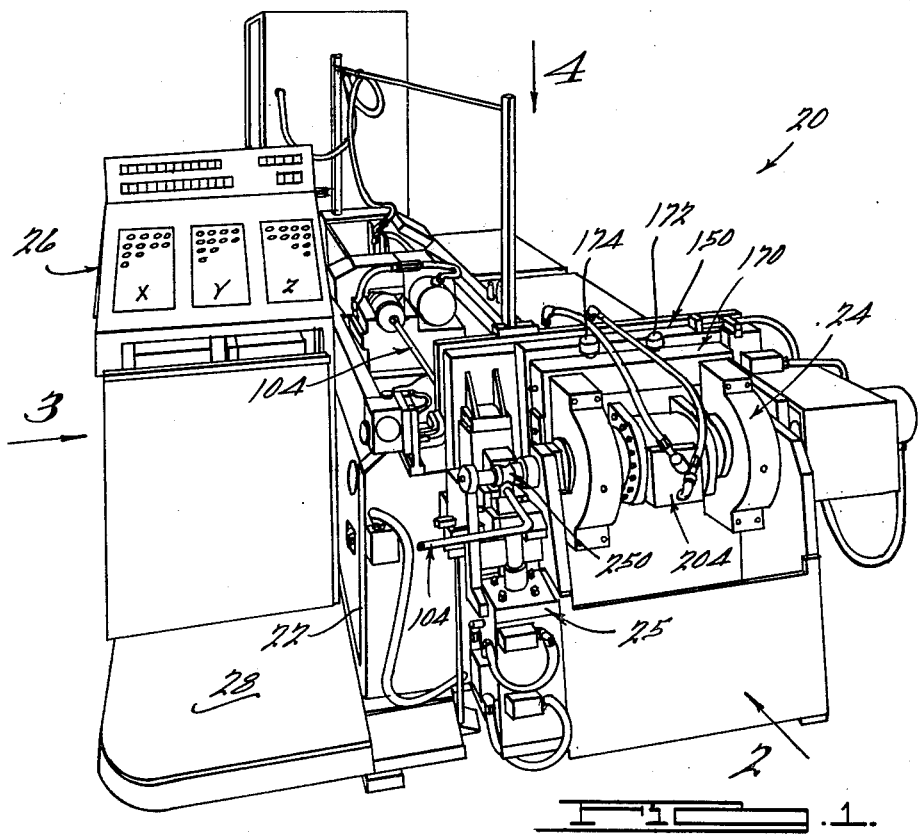
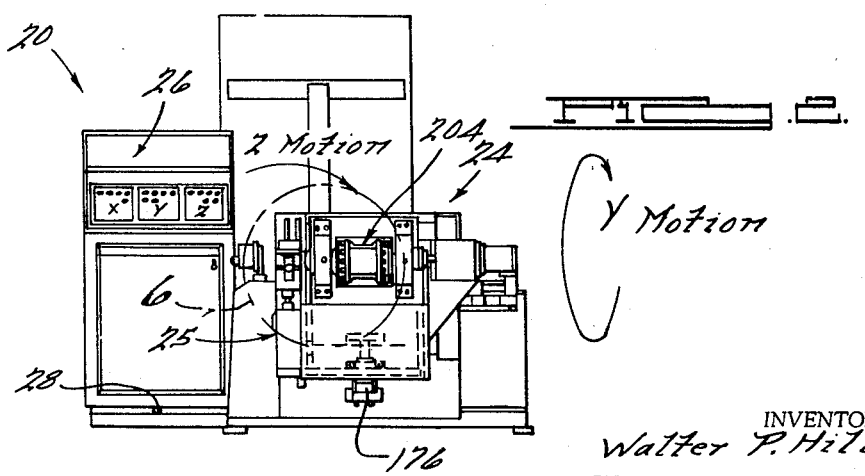
INVENTOR.
Walter P. Hill
BY
Harness, Dickey & Pierce
ATTORNEYS Aug. 25, 1964 W. P. HILL 3,145,756
NUMERICALLY CONTROLLED TUBE BENDING MACHINE
Filed Sept. 19, 1961 8 Sheets-Sheet 2
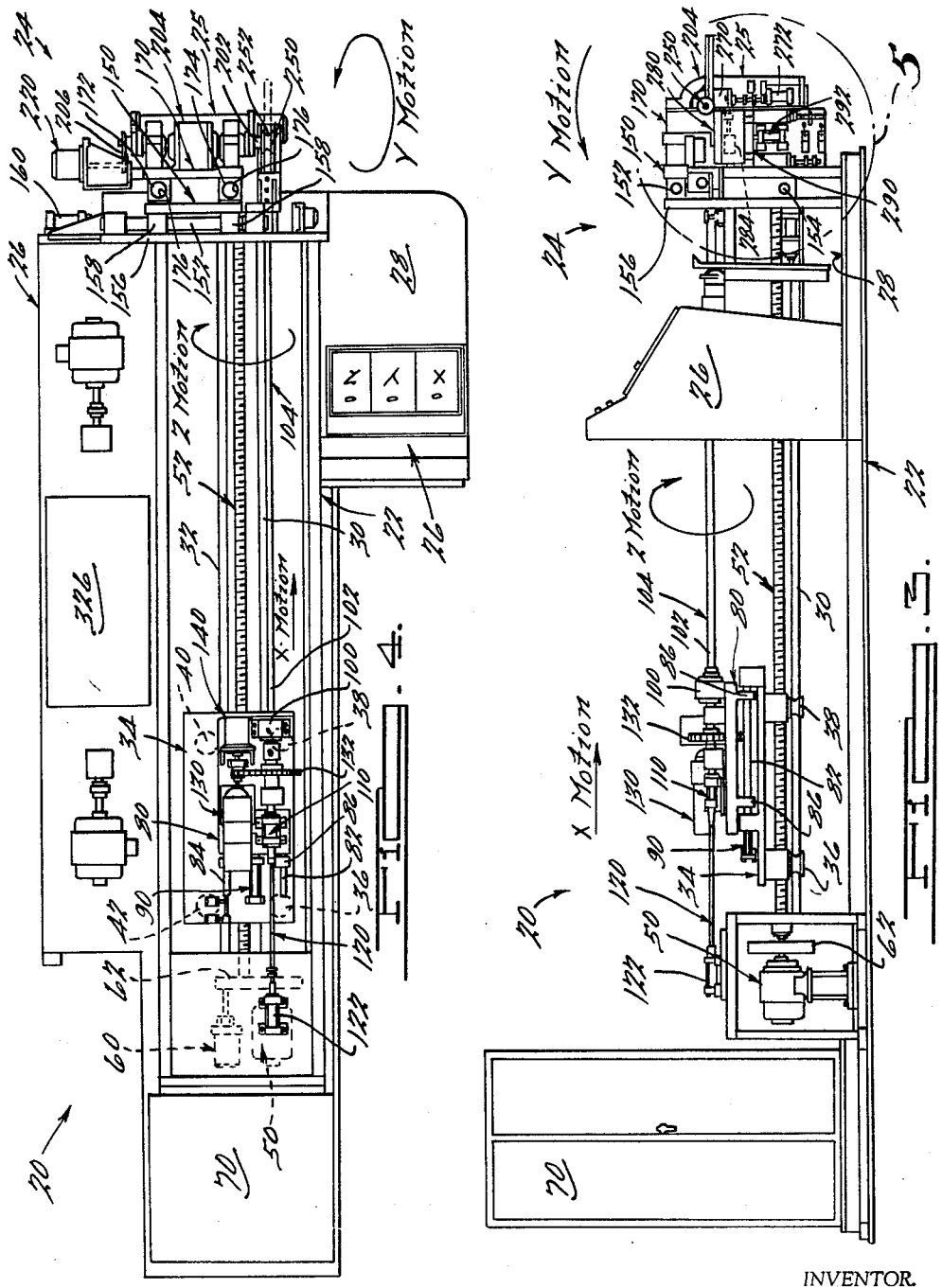
INVENTOR.
Walter P. Hill
BY
Harness, Dickey & Pierce
ATTORNEYS

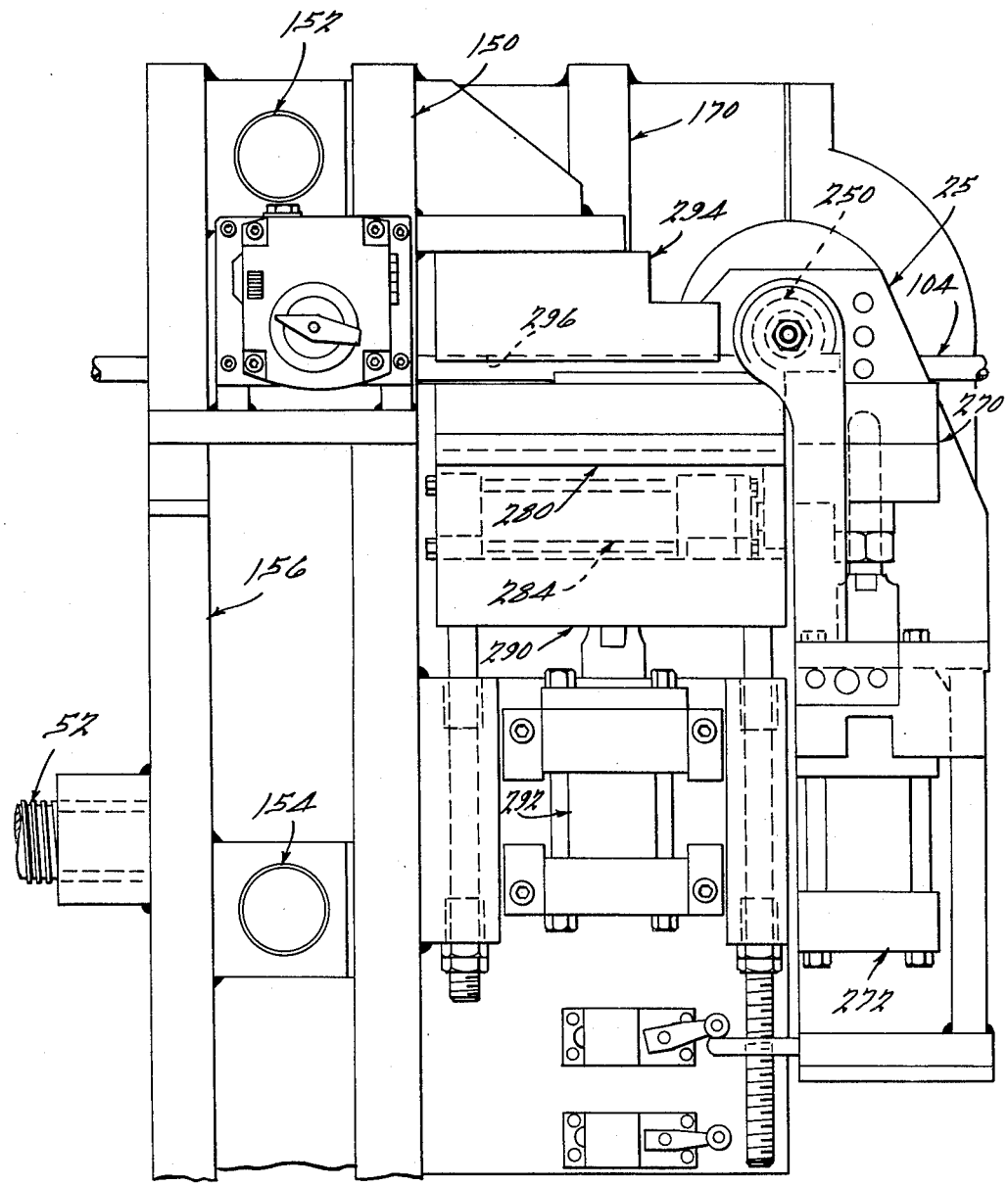

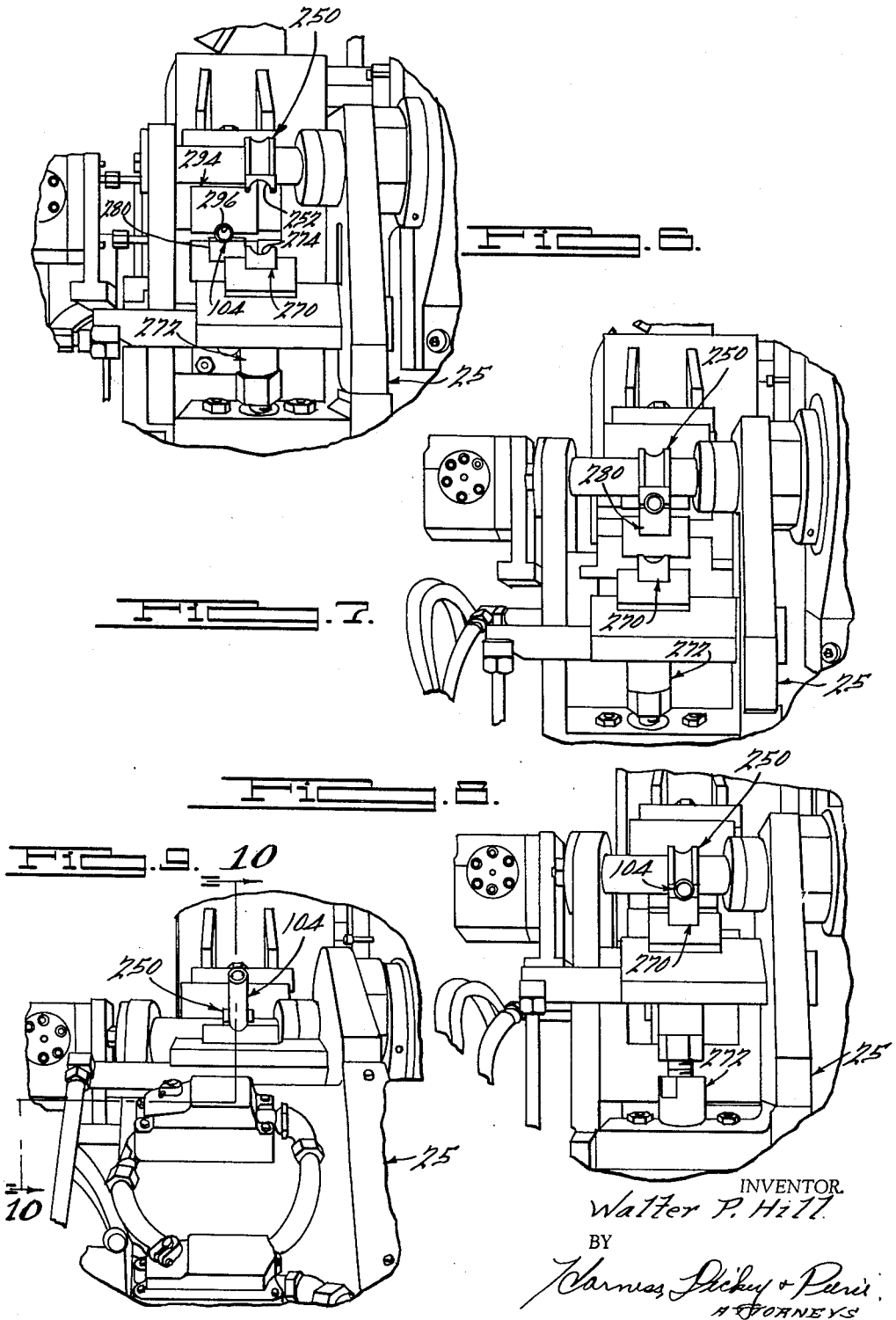

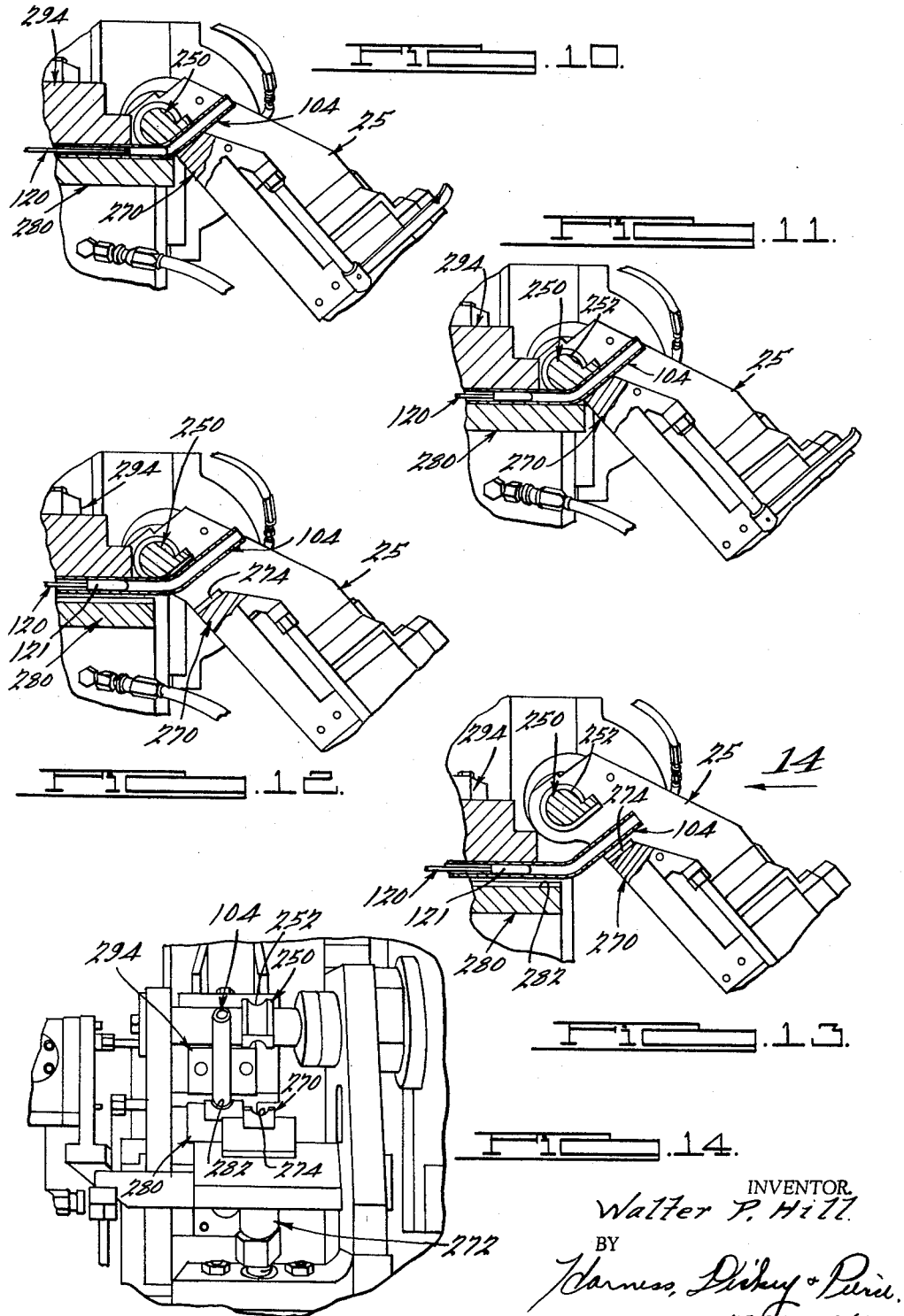

Aug. 25, 1964 W. P. HILL 3,145,756
NUMERICALLY CONTROLLED TUBE BENDING MACHINE
Filed Sept. 19, 1961 8 Sheets-Sheet 6
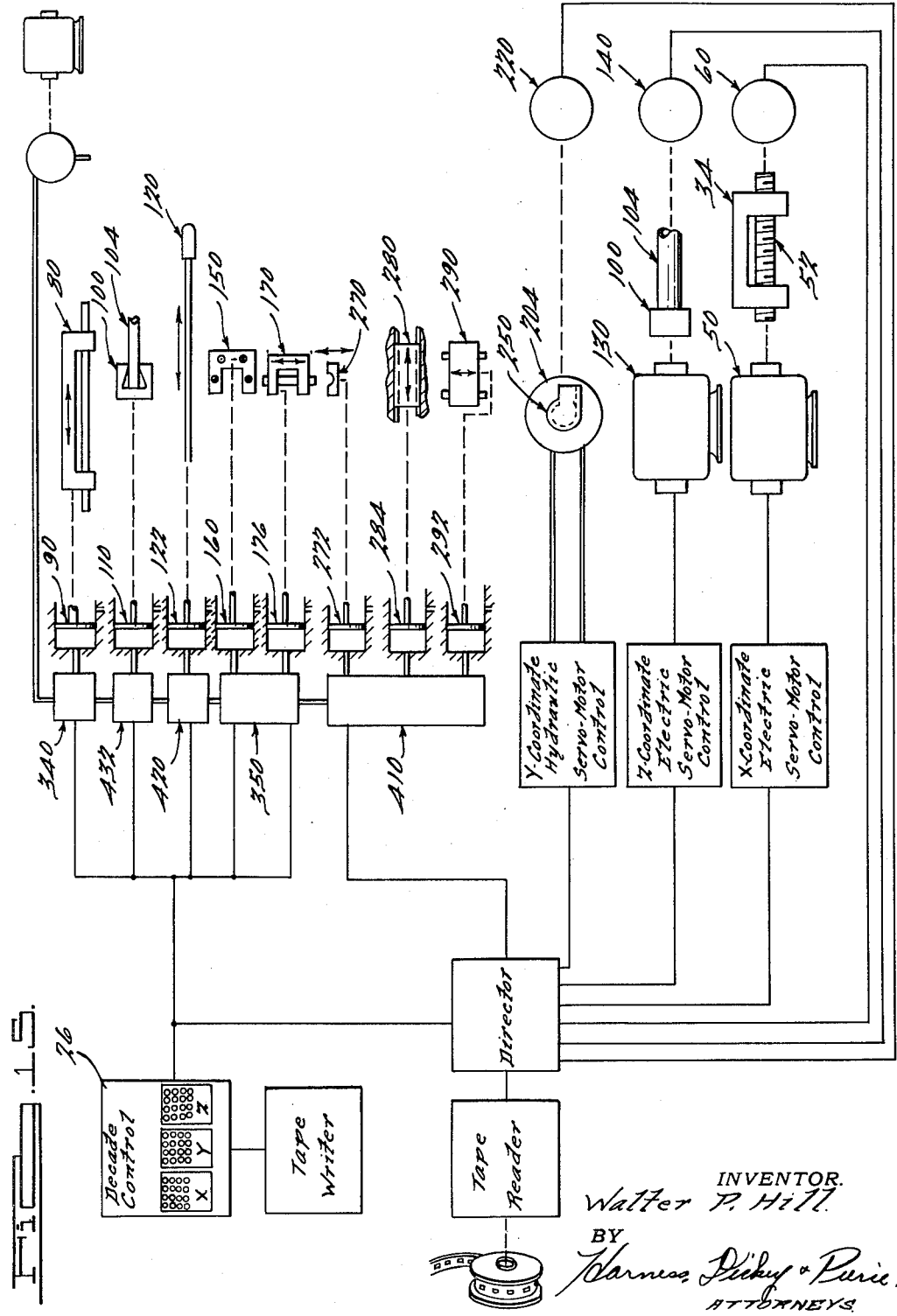
INVENTOR.
Walter P. Hill
BY
Harness, Dickey & Pierce
ATTORNEYS Aug. 25, 1964  W. P. HILL  3,145,756
NUMERICALLY CONTROLLED TUBE BENDING MACHINE
Filed Sept. 19, 1961  8 Sheets-Sheet 7
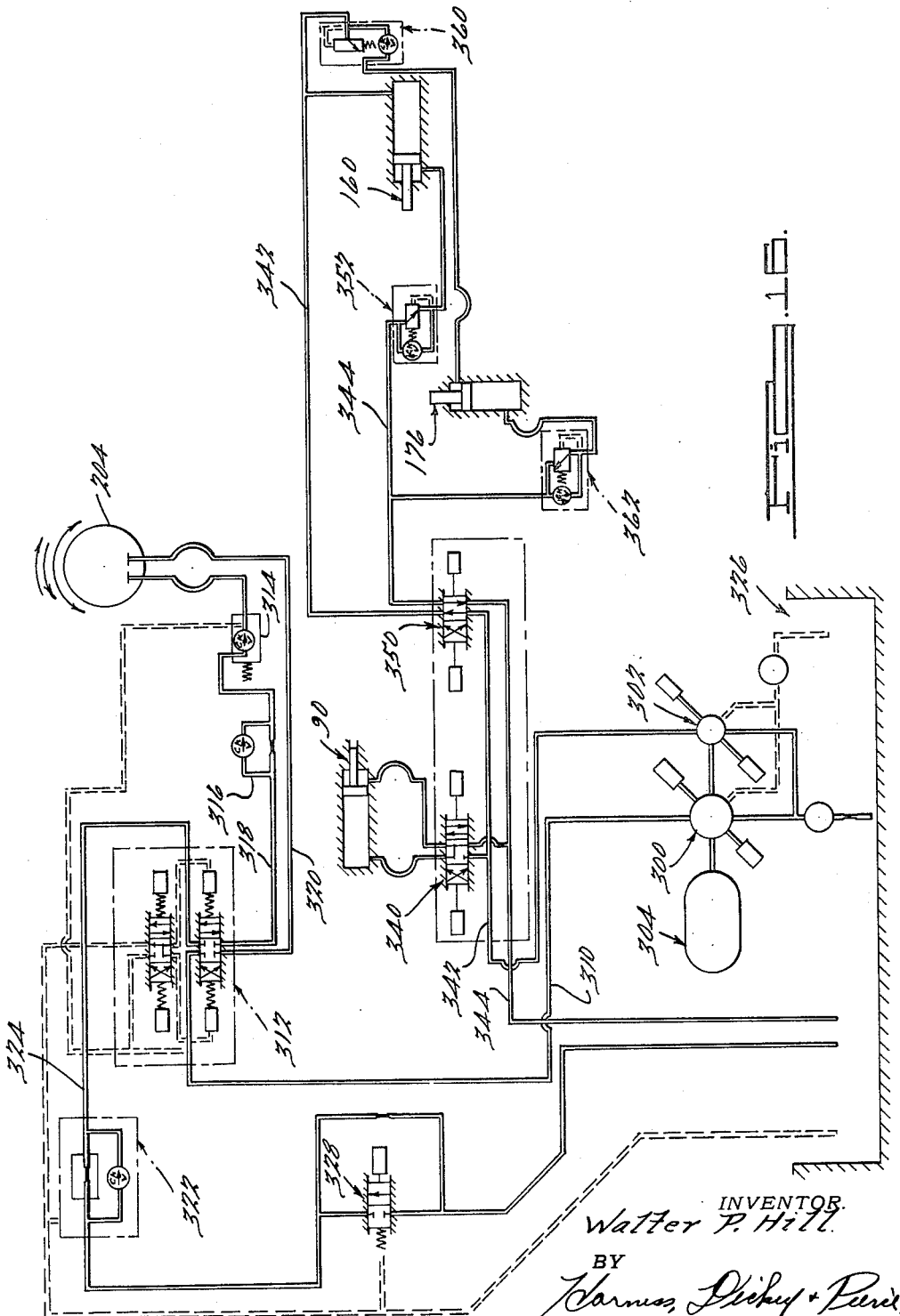
INVENTOR.
Walter P. Hill
BY
Harness, Dickey & Pierce
ATTORNEYS Aug. 25, 1964  W. P. HILL  3,145,756
NUMERICALLY CONTROLLED TUBE BENDING MACHINE
Filed Sept. 19, 1961  8 Sheets-Sheet 8
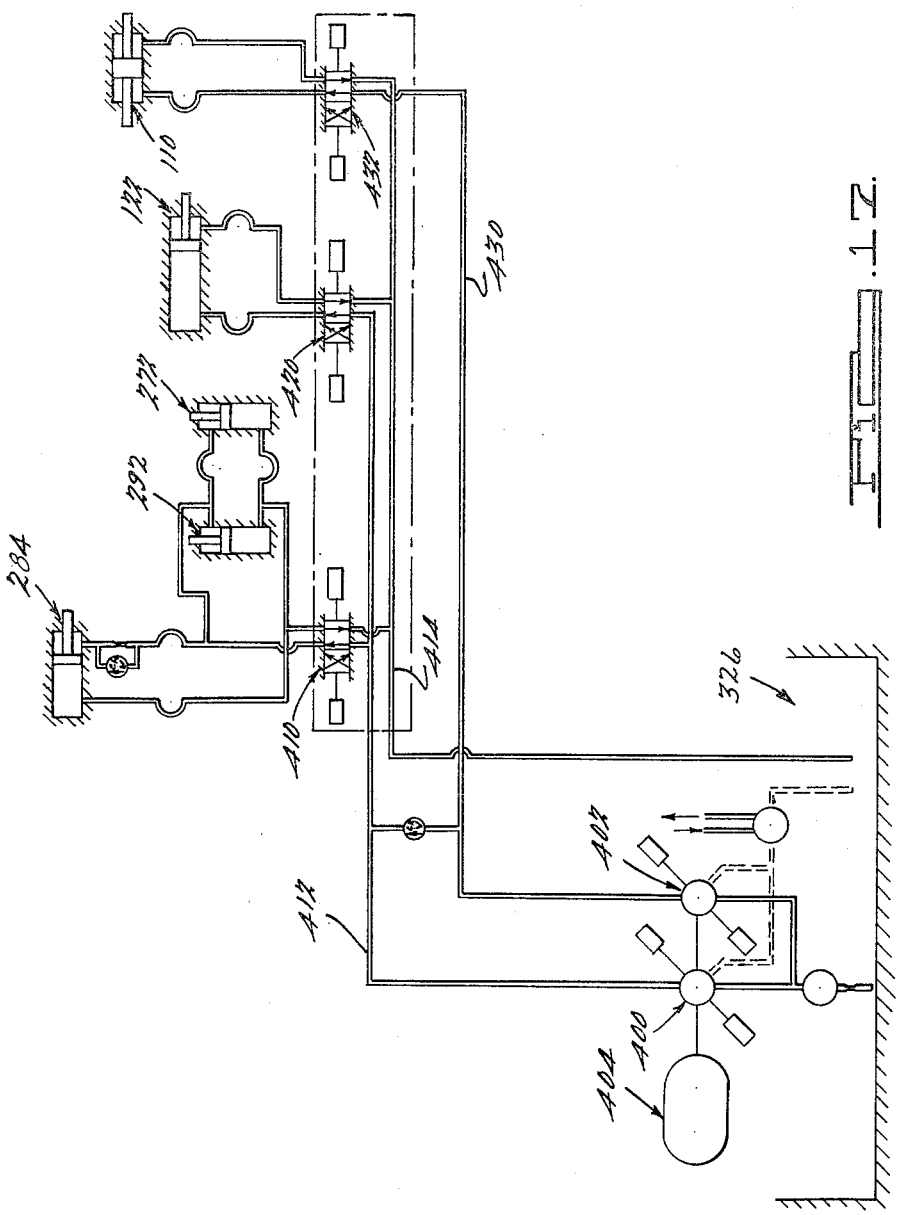
INVENTOR.
Walter P. Hill.
BY
Harness, Dickey + Pierce,
ATTORNEYS

United States Patent Office 3,145,756
Patented Aug. 25, 1964

3,145,756
NUMERICALLY CONTROLLED TUBE
BENDING MACHINE
Walter P. Hill, Detroit, Mich., assignor, by mesne assignments, to Baldwin-Lima-Hamilton Corporation, Philadelphia, Pa., a corporation of Pennsylvania
Filed Sept. 19, 1961, Ser. No. 139,286
14 Claims. (Cl. 153—20)

This invention relates generally to metalworking machinery and more particularly to a numerically controlled tube bending machine.

There has long been a need for a precision, fully automatic, numerically controlled tube bending machine capable of bending a multiplicity of tubes to specified longitudinal, radial and angular coordinates within relatively close tolerances. Known tube bending machines characteristically are either incapable of effecting precision bends, are not fully automatic, or are incapable of integration with a numerical positioning control system.

A tube bending machine in accordance with the instant invention satisfies these requirements by utilizing a bending head and associated components designed specifically for automatic programmed control of each motion incident to the indexing and precision bending of a tube.

It is desirable for a tube bending machine to provide for programming of an intelligence storage media, for example, a tape, in such a manner that minor discrepancies and tolerance errors incident to the actual bending of a tube can be corrected at the production situs concomitantly with the bending of a prototype tube.

The bending machine of the instant invention satisfies this requirement by providing for the direct entry of co-ordinate intelligence into a manually operated decade switch system thereby to control the manufacture of a prototype tube. After each bend, the machine is stopped for visual inspection of the prototype. Discrepancies that exist in the prototype are corrected by entering corrected intelligence directly into the decade switch system. After a satisfactory bend is produced, the correctly programmed data relating to that bend is written into a production tape which, upon completion, is readable in a conventional tape reader to effect automatic reproduction of the tube bent in the trial run. Thus, machine setup does not require excessive trial runs, obviates the need for off-situs programming of a control tape, and provides for the programming of the control tape by the bending machine operator as opposed to one requiring one skilled in the tape programming art.

The tube bending machine in accordance with the present invention is capable of bending a tube automatically with respect to three control coordinates hereinafter designated the X, Y and Z coordinates. The X coordinate is the position of a bend longitudinally of the tube. The Y coordinate is the angle of bend with respect to the longitudinal axis of the unbent portion of the tube. The Z coordinate is the angle of rotation of the tube with respect to an index point, for example, the plane of the first bend.

The bending machine of the instant invention comprises a bending head including a bending arm that is rotatable about an axis normal to the longitudinal axis of the tube to effect a bend therein and is movable in two directions laterally of the tube to clear the tube for indexing to a subsequent bend position. The tube is biased into engagement with an upper clamp block by a wiper block that is movable longitudinally of the tube upon bending thereof to preclude excessive strain on the tube. The wiper block is also movable laterally of the tube to condition the tube for advancement.

The tube is bent about a radius block that is supported by and rotatable with the bending arm. The tube is clamped against the radius block by a lower clamp that is supported by the bending arm and movable with respect thereto to clear the tube for advancement.

The tube is moved longitudinally with respect to the bending head by gripping one end thereof in a collet which is carried by an auxiliary carriage. The auxiliary carriage is supported on a primary carriage that is advanceable by a lead screw driven by a servo controlled electric motor. A longitudinal position sensing selsyn is connected to the primary carriage drive motor in feedback relationship.

The collet is rotated by a servo-controlled electric motor that is connected in feed-back relationship with a tube rotation sensing selsyn.

The bending arm is rotated by a hydraulic servo motor which is connected in feed-back relationship with an angle of bend-sensing selsyn.

A tape is programmed at the situs of the machine by inserting a tube into the machine and then entering intelligence into the X coordinate decade switches relating to the position of the first bend where it is automatically stored until ready for use. By applying well-known laws of tube spring-back for the material he is working with, the machine operator then computes the effective angle of the first bend. This information is entered into the Y coordinate decade switches where it is stored for future use. The Z coordinate decade switches, which relate to the radial plane of the bend in the tube, are normally not used for the first bend.

The operator then closes a cycle start switch, causing the machine to feed the tube forward to the position dictated by the X coordinate intelligence entered into the X coordinate decade switches, whereupon the tube is bent to the angle dictated by the Y coordinate intelligence entered in the Y coordinate decade switches. When the first bend is completed, the operator stops the machine in order to check the longitudinal position and angle of the bend against specifications. If the bend is proper, the operator closes a punch tape switch and the information relating to the X and Y coordinates contained in the X and Y decade switches is punched onto a tape as by a tape writer. This process is repeated for the second, third, fourth, etc. bends. It is to be noted that subsequent bends require Z coordinate intelligence to be entered on the Z coordinate decade switches.

Accordingly, one object of the instant invention is a precision numerically controlled bending machine.

Another object of the present invention is a fully automatic numerically controlled tube bending machine.

Another object is a numerically controlled bending machine capable of programming a tape while producing a prototype tube.

Other objects and advantages of the instant invention will be apparent from the following specification, claims and drawings, wherein:

FIGURE 1 is a perspective view of a bending machine in accordance with an exemplary constructed embodiment of the instant invention;

FIG. 2 is a view taken substantially in the direction of the arrow 2 of FIGURE 1;

FIG. 3 is a side elevational view taken substantially in the direction of the arrow 3 of FIGURE 1;

FIG. 4 is a top plan view taken substantially in the direction of arrow 4 of FIGURE 1;

FIG. 5 is a fragmentary view taken within the circle 5 of FIG. 3;

FIG. 6 is an enlarged fragmentary view taken in the circle 6 of FIG. 2 with the bending head in the tube advance condition;

FIG. 7 is a view similar to FIG. 6 with the radius block moved into vertical alignment with the tube;

FIG. 8 is a view similar to FIG. 7 with the lower clamp moved upwardly into engagement with the tube;

FIG. 9 is a view similar to FIG. 8 with the bending arm and radius block rotated with respect to the machine fame to bend the tube to a desired angle;

FIG. 10 is a view taken substantially along line 10—10 of FIG. 9;

FIG. 11 is a sectional view similar to FIG. 9 with the mandrel in the retracted condition;

FIG. 12 is a sectional view similar to FIG. 10 with the wiper block and lower clamp retracted;

FIG. 13 is a sectional view similar to FIG. 12 with the bending arm elevated to permit tube advance;

FIG. 14 is a fragmentary view taken in the direction of the arrow 14 of FIG. 13;

FIG. 15 is a diagrammatic view of the control system for the tube bending machine;

FIG. 16 is one portion of the hydraulic control system for the tube bending machine; and FIG. 17 is a second portion of the hydraulic control circuit for the tube bending machine.

The tubing hereinafter referred to is known in the art as thin-wall tubing having a wall thickness of approximately 2.5% of the outside diameter of the tube. The bending machine of the instant invention is capable of bending such tubes up to approximately 3.5 inches in outside diameter.

As best seen in FIGURE 1 of the drawings, a numerically controlled tube bending machine 20, in accordance with an exemplary constructed embodiment of the instant invention, comprises a base or frame 22 for the support of a bending head 24. The bending head 24 comprises an arm 25 that is rotatable about a horizontal axis with respect to the frame 22 to effect a bend in a tube, as will be more particularly described hereinafter. A control counsel 26, having X, Y and Z coordinate decade switches, is mounted adjacent the frame 22 and has an operator station 28 thereon in close proximate relation to the bending head 24. A tape writer and a tape reader (shown diagrammatically in FIG. 15) are housed within the counsel 26.

As best seen in FIGS. 3 and 4, the frame 22 comprises a pair of cylindrical longitudinally extending primary carriage ways 30 and 32 for the support of a longitudinally movable primary carriage 34. The carriage 34 is supported for movement long the ways 30 and 32 as by a plurality of rolls 36, 38, 40 and 42. The carriage 34 is driven along the ways 30 and 32 by a servo motor 50 through a lead screw 52 which is coupled to the main carriage 34 in the conventional manner. The position of the primary carriage 34 with respect to the frame 22, or, in other words, longitudinally of the ways 30 and 32 and lead screw 52, is sensed by an X coordinate selsyn 60 (FIG. 4) that is rotatably coupled to the servo motor 50 and lead screw 52 as by a gear train 62. The position of the carriage 34 as reflected by the selsyn 60 is compared with desired position intelligence entered into the X coordinate decade switches in the control counsel 26 or on a program tape, as by a conventional director and drive control (shown diagrammatically in FIG. 15), which may be housed in a suitable positioning control enclosure 70 on the frame 22 of the machine 20.

It is to be noted that the control system components comprising the intelligence storage media and translating device, for example, a tape and tape reader, the X, Y and Z coordinate decade switches, director, servo drive controls, servo motor, and position sensing selsyns are conventional in nature and commercially available, and therefore are not elaborated upon in the instant description for the purpose of clarity.

As best seen in FIG. 3, an auxiliary carriage 80 is mounted for movement with respect to the main carriage 34 and parallel to the direction of movement thereof, as by a pair of cylindrical ways 82 and 84 on the main carriage 34. The ways 82 are journaled in suitable bearings 86 on the auxiliary carriage 80. Movement of the auxiliary carriage 80 with respect to the main carriage 34 is controlled by a hydraulic auxiliary carriage actuator 90, the operating sequence of which will be discussed hereinafter.

As best seen in FIGS. 3 and 4, a collet or chuck 100 is mounted on the auxiliary carriage 80 for the acceptance of an end portion 102 of a tube 104. The tube 104 is inserted into the collet 100 by hand, whereupon a hydraulic collet actuator 110 is energized to effect gripping of the end portion 102 of the tube 104, thereby to control the tube 104 through the entire bend cycle.

A mandrel 120 extends axially of the collet 100 and through the entire length of the tube 104 to aid in effecting a precision bend in the tube 104, as will be discussed hereinafter. The mandrel 120 is movable longitudinally of the tube 104 under the control of a hydraulic mandrel actuator 122, the sequence of operation of which will be discussed hereinafter.

Rotation of the collet 100 and tube 104 or, in other words, rotation of the tube 104 through the Z coordinate of movement is effected by a servo motor 130 which drives the collet 100 through a suitable gear drive train 132. The rotative position of the servo motor 130 and collet 100 is sensed by a Z coordinate selsyn 140 (FIG. 4) that is connected to the director (FIG. 15) of the control system in feed-back reltaionship in the conventional manner.

As best seen in FIGS. 3, 4 and 5, a main bending head carriage 150 is supported for horizontal movement laterally of the frame 22 of the machine 20 on a pair of parallel horizontal cylindrical ways 152 and 154. The ways 152 and 154 are rigidly supported on a lateral end plate 156 on the frame 22 and are journaled in suitable bearings 158 on the main bending head carriage 150. Movement of the main bending head carriage 150 along the ways 152 and 154 laterally with respect to the end plate 156 of the frame 22 is one phase in clearing the tube for advancement upon completion of a bend and is controlled by a main bending head carriage control cylinder 160 (FIG. 4), the sequence of operation of which will be discussed hereinafter.

An auxiliary bending head carriage 170 is mounted for vertical movement with respect to the main bending head carriage 150 by a pair of ways 172 and 174 (FIG. 4). The ways 172 and 174 are supported by the main bending head carriage 150 and are journaled in suitable bearings 176 on the auxiliary bending head carriage 170. Vertical movement of the auxiliary bending head carriage 170 along the ways 172 and 174 and with respect to the main bending head carriage 150 is effected by a hydraulic actuator 176 (FIG. 2), that is energized to effect vertical movement of the auxiliary bending head carriage to clear the tube after a bend has been effected to permit the rotation of the tube, as will be discussed hereinafter.

As best seen in FIGS. 4 and 5, the bending arm 25 is supported for rotation about a horizontal axis with respect to the auxiliary bending head carriage 170 on an output shaft 202 of a rotary hydraulic actuator 204. The angle of rotation of the bending arm 25 with respect to the auxiliary carriage 170 is sensed by a Y motion selsyn 220 that is rotatably coupled to the output shaft 202 of the rotary actuator 204 as by a gear train 206.

As best seen in FIG. 6, a radius block 250 is supported on and in coaxial alignment with the output shaft 202 of the rotary actuator 204. The radius block 250 has an annular groove 252 therein of hemispherical radial cross section complementary to the outside diameter of the tube 104. The radius block 250 is moved into engagement with the tube, due to movement of the main and auxiliary bending head carriages 150 and 170, as will be described hereinafter.

As best seen in FIG. 10, a lower clamp 270 is supported by the bending arm 25 for vertical movement with respect thereto into engagement with the tube 104 under the control of a hydraulic lower clamp actuator 272 (FIG. 5).

The lower clamp 270 has an upwardly opening hemispherical recess 274 complementary to the outside diameter of the tube 104. The actuator 272 is energized at appropriate times in the bending sequence to bias the tube 104 upwardly against the radius block 250 and to retract the lower clamp 270 downwardly to facilitate advancement of the tube 104.

As best seen in FIG. 13, a wiper block 280 having a hemispherical recess 282 complementary to the outside diameter of the tube 104 is mounted for movement parallel to the longitudinal axis of the tube 104 under the control of a wiper block actuator 284 (FIGS. 3 and 5). The actuator 284 is energized at an appropriate time in the bending cycle so as to move the wiper block 280 with the tube 104 as it is drawn around the radius block 250 to preclude excess stretching of the tube.

As best seen in FIG. 5, the wiper block 280 and associated actuator 284 are mounted for vertical movement by a wiper block carriage 290 that is under the control of a hydraulic actuator 292. The actuator 292 is energized at an appropriate time in the bending cycle to bias the wiper block 280 upwardly to grip the tube 104 in conjunction with an upper clamp block 294. The upper clamp block 294 is fixedly mounted on the lateral end plate 156 of the frame 22 and has a downwardly opening hemispherical recess 296 complementary to the outside diameter of the tube 104.

As best seen in FIG. 16, one portion of the hydraulic control circuit for a tube bending machine 20 comprises a hydraulic pump 300 having a capacity of, for example, 18 gallons per minute at a pressure of 1000 p.s.i. and a pump 302 having a capacity of 5 gallons per minute at a pressure of 1000 p.s.i., both of which are driven by an electric motor 304, for example, a 7½ horsepower 1800 r.p.m. motor. A high pressure line 310 leads from the pump 300 to a servo valve 312 for the control of the hydraulic torque motor 204. A suitable check valve 314 and a restrictor valve 316 are placed in series flow relationship in a line 318 leading from the torque actuator 204 to the control valve 312. A line 320 extends from the control valve 312 to the actuator 204 to complete a fluid circuit therebetween.

A flow control valve 322 is connected to the tank side of the control valve 312 as by a conduit 324 and to a reservoir 326 through a second flow control valve 328.

The auxiliary slide actuator 90 for the auxiliary slide 80 is connected to the pump 302 through a control valve 340 by a line 342. A line 344 completes a fluid circuit from the auxiliary slide actuator 90 to the reservoir 326.

The primary bending head carriage actuator 160 for the primary bending head carriage 150 is connected between the high pressure line 342 and reservoir return line 344 through a primary bending head carriage control valve 350. A sequencing valve 352 is connected in series flow relationship in the low pressure line 344 between the actuator 160 and control valve 350.

The auxiliary bending head carriage actuator 176 for the auxiliary bending head carriage 170 is also controlled by the valve 350 and is connected thereto through a sequence valve 360. A counterbalance valve 362 is connected between the actuator 176 and the low pressure line 344.

As best seen in FIG. 17, a pair of 5 gallon per minute 1000 p.s.i. pumps 400 and 402 are driven as by a 7½ horsepower 1800 r.p.m. electric motor 404. The wiper block carriage actuator 284 for the wiper block 280 is connected through a flow control valve 410 to a high pressure line 412 leading to the pump 400. A low pressure line 414 is also connected through the control valve 410 to the actuator 284 to complete a fluid circuit thereto.

The control valve 410 also effects control of the wiper block carriage actuator 292 for the wiper block carriage 290 and the lower clamp actuator 272 for the lower clamp 270, which are connected in parallel relation between the high pressure line 412 and low pressure line 414.

The mandrel actuator 122 for the mandrel 120 is connected to the high pressure line 412 and to the low pressure line 414 of the pump 400 through a control valve 420.

The collet actuator 110 is connected to a high pressure line 430 leading from the pump 402 through a control valve 432. The actuator 110 is also connected to the low pressure line 414 through the valve 432 to complete a fluid circuit thereto.

It is to be noted that operation of the foregoing hydraulically operated actuators is controlled in part by the numerical positioning control system and in part by conventional limit switches and sequence valves in the control circuit.

A bending cycle is initiated by placing the tube 104 into the machine 20 so that the end portion 102 thereof is in position to be gripped by the collet 100. Upon closure of a suitable manual switch on the counsel 26, or, alternatively, as the first bit of information on a program tape is read by the tape reader (FIG. 15), the collet actuator 110 is energized to close the collet 100 and grip the end portion 102 of the tube 104. The collet 100 maintains a grip on the end portion 102 of the tube 104 to control the tube throughout the entire bending sequence.

The program for the first bend in the tube contains X coordinate information relating to the longitudinal position of the bend and Y coordinate information relating to the angle of the first bend. As discussed hereinbefore, this information can either be inserted manually into the X and Y coordinate decade switches, or, when the machine is operating automatically by a programmed tape, prepared incident to the bending of a prototype tube.

The information relating to the desired longitudinal position for the first bend and the angle thereof is fed to the director of the control system which translates the information into a signal for comparison with a signal indicative of the actual longitudinal position of the tube 104 as sensed by the selsyn 60. The servo motor 50 is energized through the X coordinate electric servo motor control to drive the carriage 34 longitudinally of the ways 30 and 32 through the lead screw 52. When the desired position for tube 104 relative to the bending head 24 is reached, as sensed by the selsyn 60, the motor 50 is deenergized.

Movement of the several movable components of the bending head 24 is best seen and understood by following through the bending sequence as illustrated in FIGURES 6 through 14. After the tube 104 is positioned longitudinally, the mandrel actuator 122 is energized to advance the mandrel 120 into position directly under the radius block 150. Concomitantly, the wiper block carriage actuator 292 is energized to bias the wiper block carriage 290 and wiper block 280 upwardly against the tube 104 thereby to bias the tube 104 upwardly into positive engagement with the upper clamp block 294. This condition is shown in FIG. 6 of the drawings.

The main bending head carriage actuator 160 is then energized to move the main bending head carriage 150 to the left. The bending arm 25 is, of course, movable laterally with the main bending head carriage 150 and therefore the radius block 250 and lower clamp thereof are moved into vertical alignment with the tube 104. After the radius block 250 and lower clamp 270 are vertically aligned with the tube 104, the auxiliary bending head carriage actuator 176 is energized to bias the auxiliary bending head carriage 170 downwardly so that the radius block 250 is moved downwardly into engagement with the upper peripheral surface of the tube 104. This position is shown in FIG. 7.

As shown in FIG. 8, the lower clamp 270 is then biased upwardly against the underside of the tube 104 immediately under the radius block 250 by energization of the lower clamp actuator 272. When this condition obtains, the tube 104 is rigidly clamped between the upper clamp 294 and wiper block 280 and between the radius block 250 and lower clamp 270.

The torque actuator 204 is then energized to rotate the bending arm 25, radius block 250 and clamp 270 through an angle sensed by the Y coordinate selsyn 220. When the angle sensed by the selsyn 220 indicates that the tube 104 has been bent to the angle dictated by the intelligence inserted into either the Y coordinate decade switches or Y coordinate program of a tape, the hydraulic actuator 204 is deenergized. This condition is shown in FIGS. 9 and 10 of the drawings. It is to be noted that the actuator 122 for the mandrel 120 is energized concomitantly with energization of the torque actuator 204 to bias the mandrel against the inner surface of the tube at the bend therein to effect a smooth, wrinkle-free bend.

Similarly, the hydraulic actuator 284 for the wiper block 280 is energized to move the wiper block 280 toward the radius block 250 thereby to preclude excessive stretching of the metal of the tube on the radially outer periphery of the bend.

As best seen in FIG. 11, subsequent to bending of the tube 104, the mandrel 120 is retracted by appropriate energization of the mandrel actuator 122.

As seen in FIG. 12, the wiper block 280 is retracted to the left and downwardly by appropriate energization of the wiper block actuator 284 and the wiper block carriage actuator 292. Also, the lower clamp 270 is retracted downwardly by appropriate energization of the lower clamp actuator 272. The auxiliary carriage actuator 90 is then energized to bias the tube 104 forwardly or to the right, as seen in FIG. 12, approximately one-half the diameter thereof, to facilitate movement of the bending arm components to clear the tube 104.

As seen in FIG. 13, the auxiliary bending head carriage actuator 176 is then energized to bias the auxiliary bending head carriage 170 upwardly carrying the arm 25, radius block 250 and lower clamp 270 therewith. Subsequently, the main bending head carriage actuator 160 is energized to bias the main bending head carriage 150 to the right, as seen in FIG. 14, thereby to clear the tube 104 for indexing to the position of the next bend. It is to be noted that the auxiliary carriage actuator 90 is energized so as to retract the auxiliary carriage 80 and therefore the tube 104 a distance approximately equal to one-half the diameter of the tube immediately prior to clamping thereof for the next bend.

From the foregoing description, it should be apparent that the tube bending machine of the instant invention represents a significant advance in the tube bending art since it solves substantialy all of the problems encountered in effecting precision bends in a tube under the control of a numerical positioning control system. The tube bending machine of the instant invention is eminently practical in that it provides for programming of a control tape at the machine situs thereby completely eliminating the heretofore tedious, expensive and relatively inaccurate task of off-situs tape programming.

The bending machine incorporates a bending head having the movements necessary to accommodate programmed tube indexing. The machine also minimizes stretching, cracking, and wrinkling of a tube in the area of the bend by providing an appropriately energized mandrel, wiper block and associated components. It is to be understood that the specific construction of the improved numerically controlled tube bending machine herein disclosed and described is presented for the purpose of explanation and illustration and is not intended to indicate limits of the invention, the scope of which is defined by the following claims.

What is claimed is:

1. A numerically controlled tube bending machine comprising a numerical positioning control system including means for accepting numerical intelligence relating to the longitudinal position of a bend, the angle of a bend, the radial plane of bend, and means for translating the numerical intelligence into control outputs, a bending head, means responsive to a control output from said translating means for moving the tube longitudinally with respect to said bending head, means for sensing the longitudinal position of the tube connected in feed-back relationship with said translating means, means responsive to a control output from said translating means for rotating the tube relative to the bending head, means for sensing the rotational position of the tube connected in feed-back relationship with said translating means, said bending head comprising means for gripping the tube on one side of an adjacent to the longitudinal bend position, a bending arm including means for gripping the tube on the opposite side of and adjacent to the longitudinal bend position from said one side, means responsive to a control output from said translating means for rotating said bending arm to bend the tube, and means for sensing the angle of bend of the tube connected in feed-back relationship with said translating means whereby the tube is bent at a longitudinal position, to an angle and in a radial plane dictated by the numerical intelligence inserted into said control system.

2. A machine for bending a metal tube comprising a numerical positioning control system including means for inserting numerical intelligence into said control system relating to a desired longitudinal position, angle and radial plane of a bend and means for translating the numerical intelligence into control signals, a bending head, means responsive to a cotnrol signal from said translating means for moving the tube longitudinally with respect to said bending head, means for sensing the longitudinal position of the tube connected in feed-back relationship with said translating means, means responsive to a control signal from said translating means for rotating the tube relative to the bending head, means for sensing the rotational position of the tube connected in feed-back relationship with said translating means, said bending head comprising an upper clamp block, a wiper block for biasing one portion of the tube into engagement with said upper clamp block, a bending arm including a radius block and a lower clamp for biasing another portion of the tube against the radius block, means responsive to a control signal from said translating means for rotating said bending arm relative to said upper clamp and wiper blocks to bend the tube, and means for sensing the angle of bend of the tube connected in feed-back relationship with said translating means whereby a bend is effected in the tube at a longitudinal position, to an angle and in a radial plane dictated by the numerical intelligence inserted into said control system.

3. A machine for bending a metal tube comprising a numerical positioning control system including means for inserting numerical intelligence into said control system relating to a desired longitudinal position, angle and radial plane of a bend and means for translating the numerical intelligence into control signals, a bending head, a main carriage for supporting one end of the tube movable relative to the said bending head, means responsive to a control signal from said translating means for moving said main carriage and tube longitudinally with respect to said bending head, means for sensing the longitudinal position of the tube connected in feed-back relationship with said translating means, means responsive to a control signal from said translating means for rotating the tube relative to the bending head, means for sensing the rotational position of the tube connected in feed-back relationship with said translating means, said bending head comprising an upper clamp block, a wide block for biasing one portion of the tube into engagement with said upper clamp block, a main bending head carriage movable horizontally with respect to said upper clamp block, an auxiliary bending head carriage supported by and movable vertically with respect to said main bending head carriage, a bending arm supported by said auxiliary bending head carriage and including a radius block and a lower clamp for biasing another portion of the tube against the radius block, means responsive to a control signal from said translating means for rotating said bending arm relative to said upper clamp and wiper blocks to bend the tube, and means for sensing the angle of bend of the tube connected in feed-back relationship with said translating means whereby a bend is effected in the tube at a longitudinal position, to an angle and in a radial plane dictated by the numerical intelligence inserted into said control system.

4. A machine for bending a metal tube comprising a numerical positioning control system including means for inserting numerical intelligence into said control system relating to a desired longitudinal position, angle and radial plane of a bend and means for translating the numerical intelligence into control signals, a bending head, a main carriage movable relative to the said bending head, an auxiliary carriage on said main carriage, means for biasing said auxiliary carriage longitudinally of said main carriage, a collet on said auxiliary carriage for engaging an end portion of the tube, means responsive to a control signal from said translating means for moving said main carriage longitudinally with respect to said bending head, means for sensing the longitudinal position of the tube connected in feed-back relationship with said translating means, means responsive to a control signal from said translating means for rotating the tube relative to the bending head, means for sensing the rotational position of the tube connected in feed-back relationship with said translating means, said bending head comprising an upper clamp block, a wiper block for biasing one portion of the tube into engagement with said upper clamp block, a main bending head carriage movable horizontally with respect to said upper clamp block, an auxiliary bending head carriage supported by and movable vertically with respect to said main bending head carriage, a bending arm supported by said auxiliary bending head carriage and including a radius block and a lower clamp for biasing another portion of the tube against the radius block, means responsive to a control signal from said translating means for rotating said bending arm relative to said upper clamp and wiper blocks to bend the tube, and means for sensing the angle of bend of the tube connected in feed-back relationship with said translating means whereby a bend is effected in the tube at a longitudinal position, to an angle and in a radial plane dictated by the numerical intelligence inserted into said control system.

5. A numerically-controlled tube bending machine comprising a numerical positioning control system including a manual input for numerical intelligence relating to the longitudinal position of a bend, the angle of a bend, the radial plane of bend, means for translating the numerical intelligence into control outputs, and means for recording the numerical intelligence in programmed relation on a storage media, a bending head, means responsive to a control output from said translating means for moving the tube longitudinally with respect to said bending head, means for sensing the longitudinal position of the tube connected in feed-back relationship with said translating means, means responsive to a control output from said translating means for rotating the tube relative to the bending head, means for sensing the rotational position of the tube connected in feed-back relationship with said translating means, said bending head comprising a bending arm, means responsive to a control output from said translating means for rotating said bending arm to bend the tube, and means for sensing the angle of bend of the tube connected in feed-back relationship with said translating means whereby the tube is bent at a longitudinal position, to an angle and in a radial plane dictated by the numerical intelligence inserted into said control system.

6. A numerically-controlled tube bending machine comprising a numerical positioning control system including manually operable decade switches for the acceptance of numerical intelligence relating to the longitudinal position of a bend, the angle of a bend, the radial plane of bend, means for translating the numerical intelligence into control outputs, a tape writer for recording the numerical intelligence inserted into said decade switches in programmed relation on a storage tape, a bending head, means responsive to a control output from said translating means for moving the tube longitudinally with respect to said bending head, means for sensing the longitudinal position of the tube connected in feed-back relationship with said translating means, means responsive to a control output from said translating means for rotating the tube relative to the bending head, means for sensing the rotational position of the tube connected in feed-back relationship with said translating means, said bending head comprising a bending arm, means responsive to a control output from said translating means for rotating said bending arm to bend the tube, and means for sensing the angle of bend of the tube connected in feed-back relationship with said translating means whereby the tube is bent at a longitudinal position, to an angle and in a radial plane dictated by the numerical intelligence inserted into said control system.

7. A numerically-controlled tube bending machine comprising a numerical positioning control system including manually operable decade switches for the acceptance of numerical intelligence relating to the longitudinal position of a bend, the angle of a bend, the radial plane of bend, means for translating the numerical intelligence into control outputs, a tape writer for recording the numerical intelligence inserted into said decade switches in programmed relation on a storage tape, a bending head, an electric servo motor responsive to a control output from said translating means for moving the tube longitudinally with respect to said bending head, a selsyn connected to the tube for sensing the longitudinal position thereof and connected in feed-back relationship with said translating means, an electric servo motor responsive to a control output from said translating means for rotating the tube relative to the bending head, a selsyn operatively connected to the tube for sensing the rotational position thereof and connected in feed-back relationship with said translating means, said bending head comprising a bending arm, a hydraulic torque motor responsive to a control output from said translating means for rotating said bending arm to bend the tube, and a selsyn operatively connected to said bending arm for sensing the angle of bend of the tube connected in feed-back relationship with said translating means whereby the tube is bent at a longitudinal position, to an angle and in a radial plane dictated by the numerical intelligence inserted into said control system.

8. The method of bending a tube comprising the steps manually operating decade switches for inserting intelligence into a bending machine control system relating to a desired longitudinal position, angle and radial plane for a bend, supporting one end of the tube for axial movement to the desired longitudinal and rotative positions, sensing the actual axial and rotative position of the tube, feeding back a signal to the control system reflecting the actual axial and rotative position of the tube, gripping a portion of the tube on one side of the longitudinal bend position, gripping an adjacent portion of the tube on the other side of the longitudinal bend position, rotating the adjacent portion of the tube relative to the one portion thereof to effect a bend in the tube, sensing the angle of bend in the tube, feeding back a signal to the control system reflecting the angle of bend to substantially eliminate any variation between the desired and sensed angle of bend, and releasing said one end adjacent portion of the tube.

9. The method of bending a tube comprising the steps of inserting intelligence into a bending machine control system relating to a desired longitudinal position, angle and radial plane for a bend, supporting one end of the tube for axial movement to the desired longitudinal and rotative positions, sensing the actual axial and rotative position of the tube, feeding back a signal to the control system reflecting the actual axial and rotative position of the tube, moving a mandrel internally of the tube to a position adjacent the longitudinal bend position, gripping a portion of the tube on one side of the longitudinal bend position between an upper clamp block and a wiper block, gripping an adjacent portion of the tube between a radius block and a lower clamp, rotating said radius block and lower clamp to effect a bend in the tube, sensing the angle of bend in the tube, feeding back a signal to the control system reflecting the angle of bend, retracting the mandrel from the position of the bend, retracting said wiper block and lower clamp from engagement with the tube, and indexing the tube to a desired longitudinal and rotative position for subsequent bend.

10. The method of bending a tube comprising the steps of inserting intelligence into a bending machine control system relating to a desired longitudinal position, angle and radial plane for a bend, supporting one end of the tube for axial movement to the desired longitudinal and rotative positions, sensing the actual axial and rotative position of the tube, feeding back a signal to the control system reflecting the actual axial and rotative position of the tube, moving the tube longitudinally and rotating the tube to substantially eliminate any variation between the desired and sensed positions, moving a mandrel internally of the tube to a position adjacent the longitudinal bend position, gripping a portion of the tube on one side of the longitudinal bend position between an upper clamp block and a wiper block, gripping an adjacent portion of the tube on the other side of the longitudinal bend position between a radius block and a lower clamp, rotating the radius block and lower clamp relative to the one portion of the tube, biasing said wiper block toward the bend position to preclude excessive stretching of the tube, sensing the angle of bend in the tube, feeding back a signal to the control system reflecting the angle of bend, retracting the mandrel from the position of the bend, retracting said wiper block, releasing the tube, and indexing the tube to a desired longitudinal and rotative position for a subsequent bend.

11. An intelligence data controlled tube bending machine comprising a positioning control system capable of accepting coded intelligence data relating to the longitudinal position of a bend and the angle of a bend, means for translating the intelligence data into control outputs, a bending head, means responsive to a control output from said translating means for moving a tube with respect to said bending head and along the longitudinal axis of the tube so that a predetermined point along the length of the tube is juxtaposed to said bending head, said bending head comprising means for gripping the tube on one side of and adjacent to the predetermined point on said tube, means for gripping the tube on the opposite side of and adjacent to said predetermined point, means responsive to a controlled output from said translating means for causing said bending head to bend the tube at said point in a manner so that the portions of the tube on opposite sides of said point are disposed at a predetermined angle with respect to each other, whereby the tube is bent at a predetermined point along its length to a predetermined angle as dictated by the intelligence data inserted into said control system.

12. Apparatus comprising a position control system including a selectively operable manual input for intelligence data, means for translating the intelligence data into control outputs, means responsive to control outputs for automatically bending a tube at a preselected point along the length of said tube with the portions of the tube on opposite sides of said point being disposed at a preselected angle, and means coupled to said manual input for recording the intelligence data inserted into said manual input in programmed relation.

13. Apparatus in accordance with claim 12 wherein said manual input includes a plurality of individually operable switches arranged so that the predetermined point of the bend is selected by operating one switch and the angle of the bend is selected by operating another switch, whereby a tube may be automatically bent at a predetermined point and to a predetermined angle merely by operating two switches.

14. A method of bending a tube comprising the steps of inserting intelligence data into a counsel of a bending machine control system, generating a first control signal in said system indicative of a predetermined point along the length of said tube, mechanically supporting one end of said tube, moving said tube in an axial direction in response to said first signal so that said predetermined point is juxtaposed to a bending head, gripping said tube on opposite sides of said predetermined point, said gripping step including gripping said tube on one side of said point with said head, moving a mandrel internally of the tube to a position adjacent said point in response to a signal from said system, generating a second control signal in said system indicative of the angle of bend, bending said tube at said predetermined point by rotating said head in response to said second signal, releasing the grip on said tube, and retracting the mandrel from said predetermined point.

References Cited in the file of this patent
UNITED STATES PATENTS

| | | |
|---|---|---|
| 2,306,224 | Parker | Dec. 22, 1942 |
| 2,382,745 | Powers | Aug. 14, 1945 |
| 2,838,963 | Good et al. | June 17, 1958 |